March 26, 1940.  L. VON REIS  2,194,728
METHOD AND APPARATUS FOR MAKING ROPES OR CORDS FROM GLASS OR SLAG
Filed Aug. 14, 1935
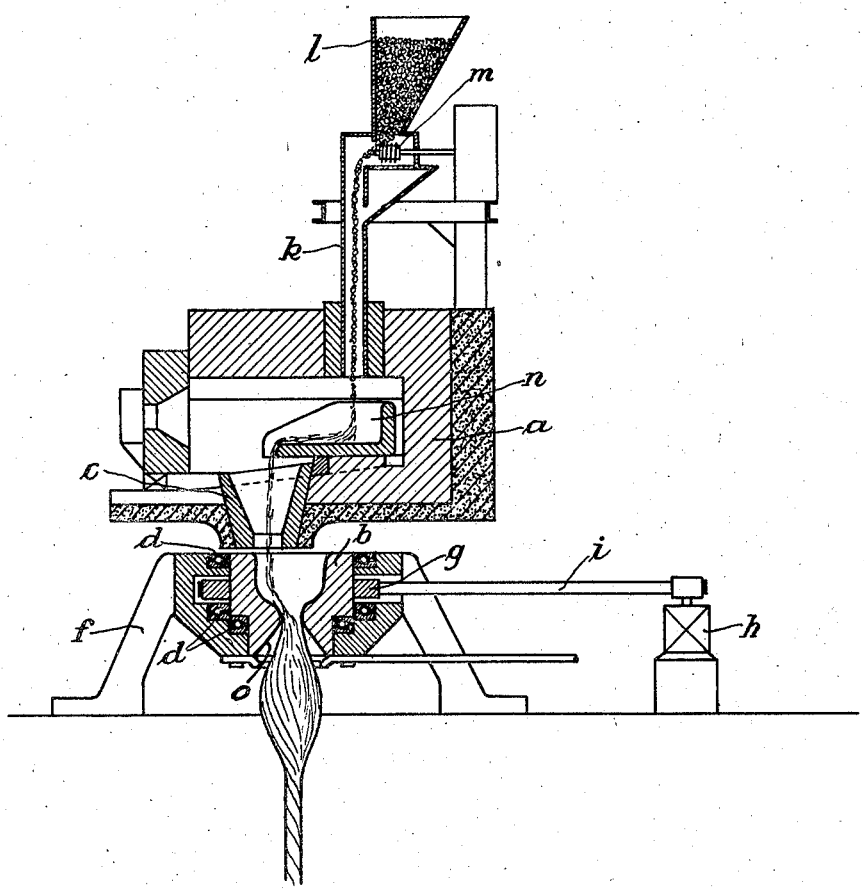

Patented Mar. 26, 1940

2,194,728

UNITED STATES PATENT OFFICE 2,194,728

METHOD AND APPARATUS FOR MAKING ROPES OR CORDS FROM GLASS OR SLAG

Lambert von Reis, Herzogenrath, Germany, assignor to Naamlooze Vennootschap Maatschappij tot Beheer en Exploitatie van Octrooien, The Hague, Netherlands Application August 14, 1935, Serial No. 36,225
In Germany August 18, 1934

5 Claims. (Cl. 49—55)

This invention relates to the manufacture of ropes, cords or threads from fibres of glass, slag and the like meltable materials.

The invention is primarily concerned with an improved method of making ropes and cords of the kind indicated, which method essentially consists in passing a stream of molten material, such as molten glass, into and through a substantially cylindrical vessel having a diverging mouth at its lower end, rapidly rotating the vessel about its vertical axis and thereby causing the molten material while on the surface of the mouth to be divided by centrifugal force into numerous fine fibres which, under the action of their own weight and the revolving motion imparted to them through the rotation of the vessel, twist into ropes or cords while continuing their downward movement.

Another object of the invention is the provision of a simple and efficient apparatus adapted to carry out the new method in such a manner as to allow ropes, cords or threads of the kind indicated to be produced in a continuous operation.

The accompanying drawing illustrates, by way of example, a vertical section of an apparatus according to the invention.

Referring to the drawing in detail, $a$ designates a heat-insulated furnace in which the material to be worked, such as glass, slag or the like, is melted and $b$ is a vessel of substantially cylindrical form which is arranged below an outlet $c$ in the bottom of the furnace. The vessel $b$ is rotatively mounted by means of ball bearings $d$ or in any suitable manner in a supporting frame $f$. It has fastened on its outer surface a belt pulley $g$ to which rotation is imparted from a motor $h$ or other source of power through a belt $i$. The supporting frame $f$ is preferably portable for allowing adjustment of the vessel $b$ relatively to the outlet $c$ and for facilitating repairs and interchanges of the vessel $b$ and the furnace outlet $c$.

The material to be worked may be fed to the furnace $a$ in granular form through a pipe $k$ to which it is supplied from a hopper $l$ by means of a worm $m$ or in any other appropriate manner. The heating of the furnace may be effected by well-known means such as gas burners, electrical heaters or the like. In the embodiment illustrated, the melting of the material takes place in a melting pot $n$ into which the material drops from the pipe $k$ and from which a stream of molten material flows continuously through the outlet $c$ to the rotating vessel $b$.

The vessel has in its interior passage a lower portion which first converges and then diverges forming an open cone-shaped mouth $o$.

The vessel $b$ is arranged eccentrically with relation to the axis of the outlet $c$ so that the stream of molten mass flowing down through the latter falls on the inner surface of the vessel and is thus caused to take part immediately in the rotation of the vessel and distribute in the interior thereof. Yet, there may also be used other suitable means for properly feeding the stream of molten material to the vessel and distributing it therein and on the mouth $o$.

The internal upper portion of the vessel relative to its restricted lower portion is of such dimension that during the rotation of the vessel there will be constantly kept a certain amount of liquid mass in the vessel to which fresh molten material is continuously supplied by the stream flowing from the melting pot, while a thin layer of the material passes axially of the vessel to the conical mouth $o$. Due to the divergent shape of this mouth the layer of liquid mass reaching it suddenly undergoes an acceleration and through the action of this acceleration and the centrifugal force of the rotating vessel the plastic mass is thrown up into numerous fine fibres. These fibres sinking down by their own weight and still revolving by the rotation imparted to them automatically tend to twist about the prolonged imaginary axis of the vessel into a rope or cord which continues to move downward. If desired, suitable mechanism may be used for assisting this downward movement and continuously carrying off the product formed. The thickness of the fibres produced in the mouth $o$ as well as the diameter and density of the rope formed from the fibres are regulated by the composition of the material to be worked, the degree of plasticity or liquidity given to it in the melten furnace, the amount of molten mass supplied in the unit of time from the furnace to the rotating vessel and the speed of rotation of the latter. Further regulations may be had by providing means for additionally heating, or even cooling, the material in its flow from the furnace outlet to and through the rotating vessel and when leaving the same.

The ropes, cords and threads produced according to the invention can be used for many purposes and are especially adapted for spinning and weaving purposes.

Having thus described my invention, what I claim as new and desire to secure by Letters Patent is:

1. The method of making ropes or cords from fibres of glass, slag, and like materials which consists in establishing a supply body of the molten material, flowing a portion of said molten material downwardly, separating the downwardly moving molten material into fine fibres by the application of centrifugal force thereto, and thereafter spinning said fibres into ropes or cords under the action of gravity and said centrifugal force.

2. In apparatus for making ropes or cords from fibres of glass, slag, or like materials, the combination of a tank for a supply body of molten material provided with an outlet for the downward discharge of a stream of said material, a hollow cylindrical vessel open at both ends located below said outlet and arranged to receive said stream of material upon its interior wall, means for rotating the vessel at a speed sufficient to divide said stream into fine fibres, the lower portion of the interior wall of the vessel being so constructed and arranged as to permit said fibres under the action of gravity and the centrifugal force induced by the rotation of said member to form into a rope or cord.

3. In apparatus for making ropes or cords from fibres of glass, slag, or like materials, the combination of a tank for a supply body of molten material provided with an outlet for the downward discharge of a stream of said material, a hollow cylindrical member open at both ends located below said outlet and having an interior wall arranged to receive said stream of material at a point remote from the axis of said member, a portion of said wall converging toward the axis of said member and another portion of said wall diverging from the axis of said member, means for rotating the member at a speed sufficient to divide the stream in contact with said interior wall into fine fibres and to thereafter cause said fibres under the action of gravity and the centrifugal force induced by the rotation of said member to form into a rope or cord.

4. In apparatus for making ropes or cords from fibres of glass, slag, or like materials, the combination of a tank for a supply body of molten material provided with an outlet for the downward discharge of a stream of said material, a hollow cylindrical member open at both ends located below said outlet with its axis located eccentrically in respect to the axis of said outlet and arranged to receive said stream of material at a point remote from the axis of said member, a portion of said wall converging toward the axis of said member and another portion below said first named portion diverging from the axis of said member, means for rotating the member at a speed sufficient to divide the stream in contact with said interior wall into fine fibres and to thereafter cause said fibres under the action of gravity and the centrifugal force induced by the rotation of said member to form into a rope or cord.

5. The method of producing glass fibres which consists in feeding a supply of molten glass to the inner wall of an elongated open-ended substantially vertically disposed hollow member, revolving the member about its longitudinal axis at a speed sufficient to convert the supply of molten glass into a thin layer of glass upon the surface of the member and to cause disruption of the layer into fibres as it issues from the lower end of the member but insufficient to prevent a downward flow of the glass by gravity, whereby said layer moves toward the lower end of the member under the action of gravity and the centrifugal force acts to divide said layer into a plurality of fine fibres as the layer issues from the lower end of the member.

LAMBERT von REIS.